(12) United States Patent
Xia et al.

(10) Patent No.: US 8,798,218 B2
(45) Date of Patent: Aug. 5, 2014

(54) METHOD AND APPARATUS FOR GENERATING SECONDARY SYNCHRONIZATION SIGNALS

(75) Inventors: Shuqiang Xia, Shenzhen (CN); Dezhong Mi, Shenzhen (CN)

(73) Assignee: ZTE Corporation (CN)

( * ) Notice: Subject to any disclaimer, the term of this patent is extended or adjusted under 35 U.S.C. 154(b) by 0 days.

(21) Appl. No.: 13/638,127

(22) PCT Filed: Feb. 18, 2011

(86) PCT No.: PCT/CN2011/071104
§ 371 (c)(1),
(2), (4) Date: Sep. 28, 2012

(87) PCT Pub. No.: WO2011/120362
PCT Pub. Date: Oct. 6, 2011

(65) Prior Publication Data
US 2013/0016801 A1 Jan. 17, 2013

(30) Foreign Application Priority Data

Mar. 31, 2010 (CN) .......................... 2010 1 0155453

(51) Int. Cl.
*H04L 7/00* (2006.01)
(52) U.S. Cl.
USPC ........... 375/354; 375/222; 375/295; 375/316; 375/340
(58) Field of Classification Search
CPC ....... H04L 7/0008; H04L 7/02; H04L 25/067; H04L 1/0045; H04L 27/2332; H04L 2027/003; H04L 1/0003; H04L 1/0071
USPC .......................... 375/354, 222, 295, 316, 340
See application file for complete search history.

(56) References Cited

U.S. PATENT DOCUMENTS

| | | | |
|---|---|---|---|
| 8,165,167 B2 * | 4/2012 | Vrcelj et al. | 370/503 |
| 2001/0046266 A1 * | 11/2001 | Rakib et al. | 375/259 |
| 2006/0274843 A1 * | 12/2006 | Koo et al. | 375/260 |
| 2008/0273522 A1 | 11/2008 | Luo et al. | |

FOREIGN PATENT DOCUMENTS

| | | |
|---|---|---|
| CN | 101373988 | 2/2009 |
| WO | 2008/144746 | 11/2008 |
| WO | WO2009154410 | 12/2009 |

OTHER PUBLICATIONS

International Search Report for International Patent Application No. PCT/CN2011/071104, mailed Jun. 9, 2011.
International Search Report dated Jan. 8, 2014 for Application No. 11761936.1-1505/2555563 PCT/CN2011071104.
Abstract of WO2009154410.

* cited by examiner

*Primary Examiner* — Ted Wang
(74) *Attorney, Agent, or Firm* — McAndrews, Held & Malloy, Ltd.

(57) ABSTRACT

The present invention provides a method and an apparatus for generating secondary synchronization signals, wherein the method comprises steps of: determining a value of iteration times M according to a total number N of cell ID groups or a cell ID group index $N_{ID}^{(1)}$, wherein M is a natural number; calculating to obtain M cyclic shift accumulation parameters $q_k$ (k=0, 1 ... M−1) through M times of iterations; calculating a common cyclic shift factor m' through $q_0$; calculating a first cyclic shift value $m_0$ and a second cyclic shift value $m_1$ according to m'; and generating the secondary synchronization signals according to $m_0$ and $m_1$. The present invention solves the problem that the method for generating the secondary synchronization signals in related arts cannot support a greater number of cell ID groups.

15 Claims, 3 Drawing Sheets

METHOD AND APPARATUS FOR GENERATING SECONDARY SYNCHRONIZATION SIGNALS

FIELD OF THE INVENTION

The present invention relates to the field of mobile communications, and in particular to a method and an apparatus for generating secondary synchronization signals.

BACKGROUND OF THE INVENTION

In a Long Term Evolution (LTE) system, in order to obtain the information such as a cell ID and the like, and to complete time/frequency synchronization, User Equipment (UE) needs to implement cell search. The cell search is completed based on three kinds of signals: a primary synchronization signal, a secondary synchronization signal and a downlink common pilot, wherein the primary synchronization signal is used for Orthogonal Frequency Division Multiplexing (OFDM) symbol timing and frequency compensation, the secondary synchronization signal is mainly used for frame synchronization and cell ID group identification, and the downlink common pilot is used for system information demodulation.

According to the LTE standard (36.211: Physical channel and modulation), there are totally 168 secondary synchronization signals, respectively representing 168 cell ID (cell identification number) groups. The cell ID group indexes of the secondary synchronization signals are $N_{ID}^{(1)}$ ($N_{ID}^{(1)}=0, 1 \ldots 167$). At a transmitting end, a base station determines two short code sequences according to $N_{ID}^{(1)}$. The two short code sequences are sourced from a Golden sequence of which the length is 31, only the corresponding cyclic shifts of the Golden sequence are different, the specific cyclic shifts are related to $N_{ID}^{(1)}$, $m_0$ and $m_1$ respectively represent cyclic shift values corresponding to the two short code sequences. Specifically, the method for obtaining $m_0$ and $m_1$ according to $N_{ID}^{(1)}$ can be represented by the following formula (1):

$$m_0 = m' \bmod 31 \qquad (1)$$
$$m_1 = (m_0 + \lfloor m'/31 \rfloor + 1) \bmod 31$$
$$m' = N_{ID}^{(1)} + q(q+1)/2$$
$$q = \left\lfloor \frac{N_{ID}^{(1)} + q'(q'+1)/2}{30} \right\rfloor$$
$$q' = \lfloor N_{ID}^{(1)}/30 \rfloor$$
$$N_{ID}^{(1)} = 0, 1 \ldots 167$$

As shown in table 1 below, a relation table between $N_{ID}^{(1)}$ and $m_0$, $m_1$ can be obtained according to the formula (1).

Similarly, according to the 36.211 standard, one radio frame comprises 20 time slots; the secondary synchronization signals are transmitted on 62 sub-carriers (not comprising direct-current carriers) in the middle of penultimate symbols of the time slot 0 and the time slot 10. The specific transmitting method is that: the 62 carriers are divided into two parts, i.e. 31 carriers with odd indexes and 31 carriers with even indexes. In the time slot 0: the sequences corresponding to $m_0$ are transmitted on the carriers with the even indexes, and the sequences corresponding to $m_1$ are transmitted on the carriers with the odd carriers; in the time slot 10, the sequences corresponding to $m_1$ are transmitted on the carriers with the even indexes, and the sequences corresponding to $m_0$ are transmitted on the carriers with the odd carriers.

Via table 1, it can be seen that: $m_0$ is always less than $m_1$. Actually, in the receiving end, the terminal obtains the frame synchronization just by adopting the property. Suppose that, in the receiving end, the cyclic shift value of the sequence which is detected on the carriers with even indexes by the terminal is X, and the cyclic shift value of the sequence which is detected on the carriers with odd indexes by the terminal is Y, the step that the terminal obtains the frame synchronization and the cell ID group indexes according to X and Y is that:

1) if X is less than Y, it can be determined that the time slot of the secondary synchronization signals which are currently received is the time slot 0; and if X is greater than Y, it can be determined that the time slot of the secondary synchronization signals which are currently received is the time slot 10. If X=Y (such conditions exist because of interferences or channel fading), it can be determined that the currently-received signals are unreliable, and it is needed to wait for re-testing the subsequent secondary synchronization signals.

2) The cell ID group index $N_{ID}^{(1)}$ is obtained according to the formula (2):

$$N_{ID}^{(1)} = \sum_{i=0}^{|X-Y|-1} W_i + X \qquad (2)$$
$$W_i = \text{Mod}(31 - i, 31).$$

In an LTE-Advanced network, because of the introduction of Micro-cell, Pico-cell, Relay, Home NodeB and the like, the 168 cell ID groups in the existing standard cannot satisfy the requirements; it is very necessary to design a new mapping relation between the cell ID group index $N_{ID}^{(1)}$ and $m_0$, $m_1$ so as to support a greater number of the cell ID groups.

When designing the new mapping relation, it is very necessary to make the newly-designed mapping relation and the mapping relation in the existing standard be compatible, which is able to simplify the realization of the transmitting end and the detection complexity of the terminal. One simplest method is to adopt the former formula (1) and to expand the formula (1) to make $N_{ID}^{(1)}$ be greater than 167. However, when $N_{ID}^{(1)}$ is greater than or equal to 234, questions can be generated when applying the formula (1). For example: when $N_{ID}^{(1)}=234$, according to the formula (1), it can be calculated that $m_0=22$, and $m_1=0$, here, $m_0$ is greater than $m_1$. But according to the former descriptions, if the terminal still implements the frame synchronization and obtains the cell ID group indexes according to the former methods, the frame synchronization can be failed, and the obtained cell ID group indexes are also incorrect; therefore the terminal cannot be normally accessed to the system.

From the above, the method for generating the secondary synchronization signals in the related technologies cannot support a greater number of cell ID groups.

TABLE 1

| $N_{ID}^{(1)}$ | $m_0$ | $m_1$ |
| --- | --- | --- |
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |

TABLE 1-continued

| $N_{ID}^{(1)}$ | $m_0$ | $m_1$ |
|---|---|---|
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |

TABLE 1-continued

| $N_{ID}^{(1)}$ | $m_0$ | $m_1$ |
|---|---|---|
| 165 | 0 | 7 |
| 166 | 1 | 8 |
| 167 | 2 | 9 |
| — | — | — |
| — | — | — |

SUMMARY OF THE INVENTION

The present invention mainly provide a method and an apparatus for generating secondary synchronization signals, which solves the problem that the method for generating the secondary synchronization signals in the related technologies cannot support a greater number of cell ID groups.

A method for generating secondary synchronization signals is provided according to one aspect of the present invention, comprising: determining a value of iteration times M according to a total number N of cell ID groups or a cell ID group index $N_{ID}^{(1)}$, wherein M is a natural number; calculating to obtain M cyclic shift accumulation parameters $q_k$ (k=0, 1 ... M−1) through M times of iterations; calculating a common cyclic shift factor m' through $q_0$; calculating a first cyclic shift value $m_0$ and a second cyclic shift value $m_1$ according to m'; and generating the secondary synchronization signals according to $m_0$ and $m_1$.

Preferably, the step of calculating to obtain the M cyclic shift accumulation parameters $q_k$ (k=0, 1 ... M−1) through M times of iterations comprises: $q_M = \lfloor N_{ID}^{(1)}/30 \rfloor$;

$$q_{k-1} = \left\lfloor \frac{N_{ID}^{(1)} + q_k(q_k+1)/2}{30} \right\rfloor (1 \le k \le M).$$

Preferably, the step of calculating the common cyclic shift factor m' through $q_0$ comprises: m'=$N_{ID}^{(1)}$+$q_0(q_0+1)/2$.

Preferably, the step of calculating the first cyclic shift value $m_0$ and the second cyclic shift value $m_1$ according to comprises: $m_0$=m' mod 31, $m_1$=($m_0$+$\lfloor m'/- \rfloor$+1)mod 31.

Preferably, the step of determining the value of M according to the total number N of the cell ID groups comprises: when N<234, M=1; when 234=<N<329, M=2; when 329=<N<387, M=3; when 387−<N<465, M=9.

Preferably, the step of determining the value of M according to the cell ID group index $N_{ID}^{(1)}$ comprises: when $N_{ID}^{(1)}$<234, M=1; when 234=<$N_{ID}^{(1)}$<329, M=2; when 329=<$N_{ID}^{(1)}$<387, M=3; when 387=<$N_{ID}^{(1)}$<465, M=9.

Preferably, the step of generating the secondary synchronization signals according to $m_0$ and $m_1$ comprises: obtaining a first shift sequence by shifting a Golden sequence according to $m_0$; and obtaining a second shift sequence by shifting the Golden sequence according to $m_1$.

Preferably, after the step of generating the secondary synchronization signals according to $m_0$ and $m_1$, the method further comprises: on time slot 0, transmitting the first shift sequence on a carrier with an even index, and transmitting the second shift sequence on a carrier with an odd index; on time slot 10, transmitting the second shift sequence on a carrier with an even index, and transmitting the first shift sequence on a carrier with an odd index.

Preferably, after the step of transmitting the first shift sequence and the second shift sequence, the method further comprises: receiving a third shift sequence on a carrier with an even index on a current time slot, and receiving a fourth shift sequence on a carrier with an odd index on the current time slot; determining a third cyclic shift value $m_2$ corresponding to the third shift sequence and a fourth cyclic shift value $m_3$ corresponding to the fourth shift sequence; comparing $m_2$ and $m_3$; if $m_2$ is less than $m_3$, representing that the current time slot is time slot 0; if $m_2$ is greater than $m_3$, representing that the current time slot is time slot 10.

Preferably, after the step of determining $m_2$ and $m_3$, the method further comprises: obtaining the cell ID group index $N_{ID}^{(1)}$ according to $m_2$ and $m_3$, wherein $$N_{ID}^{(1)} = \sum_{i=0}^{|m_2-m_3|-1} W_i + m_2$$

$$W_i = \text{Mod}(31-i, 31).$$

An apparatus for generating secondary synchronization signals is provided according to another aspect of the present invention, comprising: a first processing module, configured to determine a value of iteration times M according to a total number N of cell ID groups or a cell ID group index $N_{ID}^{(1)}$, wherein M is a natural number; a second processing module, configured to calculate to obtain M cyclic shift accumulation parameters $q_k$ (k=0, 1 ... M−1) through M times of iterations; a third processing module, configured to calculate a common cyclic shift factor m' through $q_0$; a fourth processing module, configured to calculate a first cyclic shift value $m_0$ and a second cyclic shift value $m_1$ according to m'; and a generation module, configured to generate the secondary synchronization signals according to $m_0$ and $m_1$.

Preferably, the second processing module is configured to calculate to obtain the M cyclic shift accumulation parameters $q_k$ (k=0, 1 ... M−1) through the following formula:

$$q_M = \lfloor N_{ID}^{(1)}/30 \rfloor; q_{k-1} = \left\lfloor \frac{N_{ID}^{(1)} + q_k(q_k+1)/2}{30} \right\rfloor (1 \le k \le M).$$

Preferably, the third processing module is configured to calculate the common cyclic shift factor m' through the following formula: m'=$N_{ID}^{(1)}$+$q_0(q_0+1)/2$.

Preferably, the fourth processing module is configured to calculate the first cyclic shift value $m_0$ and the second cyclic shift value $m_1$ through the following formula:

$m_0$=m' mod 31,$m_1$=($m_0$+$\lfloor m'/31 \rfloor$+1)mod 31.

Preferably, the generation module comprises: a first generation sub-module, configured to obtain a first shift sequence by shifting a Golden sequence according to $m_0$; and a second generation sub-module, configured to obtain a second shift sequence by shifting the Golden sequence according to $m_1$.

The present invention has the advantages as follows.

1) The present invention selects different M values for different cell ID group indexes $N_{ID}^{(1)}$, to calculate, according to the M values, $m_0$ and $m_1$ which are used for generating the secondary synchronization signals. The secondary synchronization signals which are generated through such method can support a greater number of cell ID groups. The problem that the method for generating the secondary synchronization signals in the related technologies cannot support a greater number of the cell ID groups can be solved, and the requirements of the greater number of the cell ID groups can be satisfied.

2) The method for generating the secondary synchronization signals provided by the present invention has excellent backward compatibility, which greatly simplifies the realization complexity of the transmitting end. Additionally, the present invention guarantees that the receiving end can realize the frame synchronization and cell ID group index detection, so as to simplify the realization complexity of the terminal.

BRIEF DESCRIPTION OF THE DRAWINGS

Drawings, provided for further understanding of the present invention and forming a part of the specification, are used to explain the present invention together with embodiments of the present invention rather than to limit the present invention, wherein.

DETAILED DESCRIPTION OF THE EMBODIMENTS

The present invention is described in details with reference to the drawings and embodiments below. It should be noted that, the embodiments and characters in the embodiments of the application can be mutually combined under the condition of no conflict.

Figure 1:
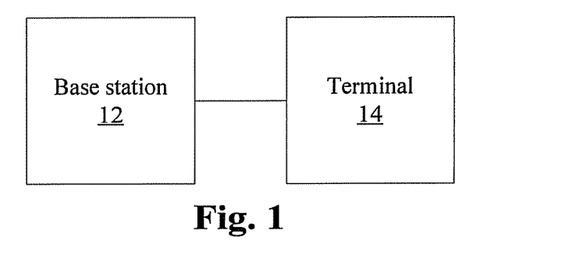
FIG. 1 shows a diagram of a wireless communication system according to an embodiment of the present invention.

The embodiments of the present invention can be based on a wireless communication system in FIG. 1. As shown in FIG. 1, the wireless communication system comprises: a base station 12 and a terminal 14. The wireless communication system is applied in an LTE-Advanced network; and Micro-cell, Pico-cell, Relay, HomeNodeB and the like may exist in the network.

Firstly, the method for generating the secondary synchronization signals is described with reference to the drawings according to an embodiment of the present invention.

Figure 2:
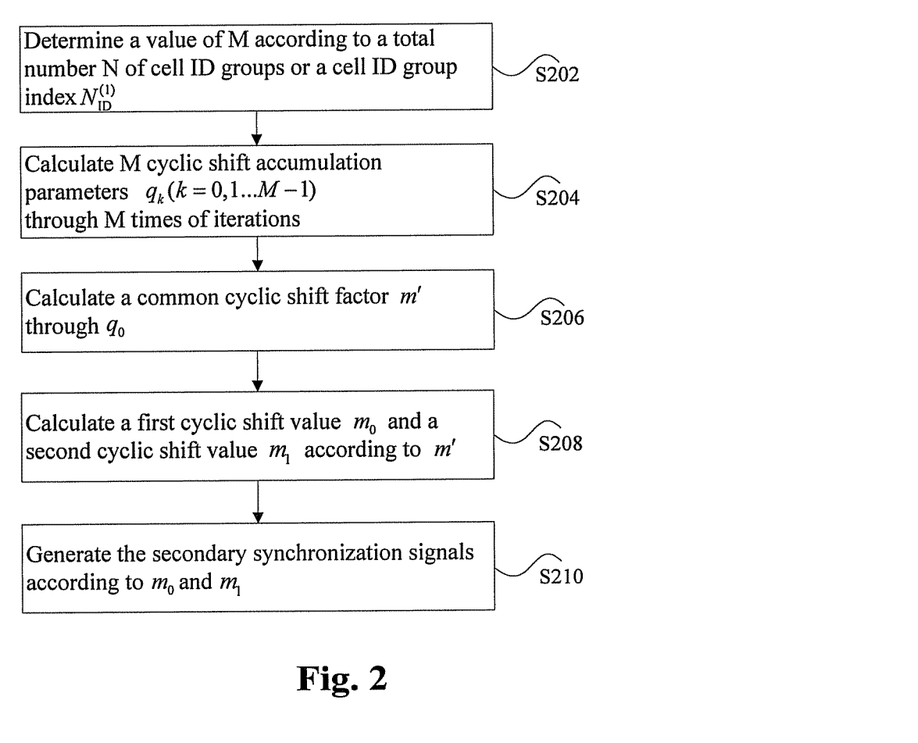
FIG. 2 shows a flow chart of the method for generating the secondary synchronization signals according to an embodiment of the present invention.

As shown in FIG. 2, the method for generating the secondary synchronization signals comprises the steps that:

S202, a value of iteration times M is determined according to a total number N of cell ID groups or a cell ID group index $N_{ID}^{(1)}$, wherein M is a natural number;

S204, M cyclic shift accumulation parameters $q_k$ (k=0, 1 ... M−1) are calculated through M times of iterations;

S206, a common cyclic shift factor m' is calculated through $q_0$;

S208, a first cyclic shift value $m_0$ and a second cyclic shift value $m_1$ are calculated according to m'; and S210, the secondary synchronization signals are generated according to $m_0$ and $m_1$.

The embodiment of the present invention selects different M values for different cell ID group indexes $N_{ID}^{(1)}$, to calculate, according to the M values, $m_0$ and $m_1$ which are used for generating the secondary synchronization signals. The secondary synchronization signals which are generated through such method can support a greater number of cell ID groups. The problem that the method for generating the secondary synchronization signals in the related technologies cannot support a greater number of the cell ID groups can be solved, and the requirements of the greater number of the cell ID groups can be satisfied.

Preferably, the step of calculating M cyclic shift accumulation parameters $q_k$ (k=0, 1 ... M−1) through M times of iterations comprises: $q_M = \lfloor N_{ID}^{(1)}/30 \rfloor$;

$$q_{k-1} = \left\lfloor \frac{N_{ID}^{(1)} + q_k(q_k+1)/2}{30} \right\rfloor (1 \leq k \leq M).$$

Preferably, the step of calculating the common cyclic shift factor m' through $q_0$ comprises: $m' = N_{ID}^{(1)} + q_0(q_0+1)/2$.

Preferably, the step of calculating the first cyclic shift value $m_0$ and the second cyclic shift value according to $m_1$ comprises: $m_0 = m' \bmod 31$, $m_1 = (m_0 + \lfloor m'/31 \rfloor + 1) \bmod 31$.

Preferably, the step of determining the value of M according to the total number N of the cell ID groups comprises that:

1) when N<234, M=1;

preferably, the first cyclic shift value $m_0$ and the second cyclic shift value $m_1$ are calculated through the following formula:

$$m_0 = m' \bmod 31$$
$$m_1 = (m_0 + \lfloor m'/31 \rfloor + 1) \bmod 31$$
$$m' = N_{ID}^{(1)} + q_0(q_0+1)/2$$
$$q_0 = \left\lfloor \frac{N_{ID}^{(1)} + q_1(q_1+1)/2}{30} \right\rfloor$$
$$q_1 = \lfloor N_{ID}^{(1)}/30 \rfloor$$
$$N_{ID}^{(1)} = 0, 1 \ldots 233$$

2) when 234=<N<329, M=2;

preferably, the first cyclic shift value $m_0$ and the second cyclic shift value $m_1$ are calculated through the following formula:

$$m_0 = m' \bmod 31$$
$$m_1 = (m_0 + \lfloor m'/31 \rfloor + 1) \bmod 31$$
$$m' = N_{ID}^{(1)} + q_0(q_0+1)/2$$
$$q_0 = \left\lfloor \frac{N_{ID}^{(1)} + q_1(q_1+1)/2}{30} \right\rfloor$$
$$q_1 = \left\lfloor \frac{N_{ID}^{(1)} + q_2(q_2+1)/2}{30} \right\rfloor$$
$$q_2 = \lfloor N_{ID}^{(1)}/30 \rfloor$$
$$N_{ID}^{(1)} = 0, 1 \ldots 328$$

3) when 329=<N<387, M=3;

preferably, the first cyclic shift value $m_0$ and the second cyclic shift value $m_1$ are calculated through the following formula:

$$m_0 = m' \bmod 31$$
$$m_1 = (m_0 + \lfloor m'/31 \rfloor + 1) \bmod 31$$
$$m' = N_{ID}^{(1)} + q_0(q_0+1)/2$$
$$q_0 = \left\lfloor \frac{N_{ID}^{(1)} + q_1(q_1+1)/2}{30} \right\rfloor$$
$$q_1 = \left\lfloor \frac{N_{ID}^{(1)} + q_2(q_2+1)/2}{30} \right\rfloor$$
$$q_2 = \left\lfloor \frac{N_{ID}^{(1)} + q_3(q_3+1)/2}{30} \right\rfloor$$

-continued $$q_3 = \lfloor N_{ID}^{(1)}/30 \rfloor$$

$$N_{ID}^{(1)} = 0, 1 \ldots 386$$

4) when $387 =< N < 465$, M=9.

Preferably, the first cyclic shift value $m_0$ and the second cyclic shift value $m_1$ are calculated through the following formula:

$$m_0 = m' \bmod 31$$

$$m_1 = (m_0 + \lfloor m'/31 \rfloor + 1) \bmod 31$$

$$m' = N_{ID}^{(1)} + q_0(q_0+1)/2$$

$$q_0 = \lfloor \frac{N_{ID}^{(1)} + q_1(q_1+1)/2}{30} \rfloor$$

$$q_1 = \lfloor \frac{N_{ID}^{(1)} + q_2(q_2+1)/2}{30} \rfloor$$

$$q_2 = \lfloor \frac{N_{ID}^{(1)} + q_3(q_3+1)/2}{30} \rfloor$$

$$q_3 = \lfloor \frac{N_{ID}^{(1)} + q_4(q_4+1)/2}{30} \rfloor$$

$$q_4 = \lfloor \frac{N_{ID}^{(1)} + q_5(q_5+1)/2}{30} \rfloor$$

$$q_5 = \lfloor \frac{N_{ID}^{(1)} + q_6(q_6+1)/2}{30} \rfloor$$

$$q_6 = \lfloor \frac{N_{ID}^{(1)} + q_7(q_7+1)/2}{30} \rfloor$$

$$q_7 = \lfloor \frac{N_{ID}^{(1)} + q_8(q_8+1)/2}{30} \rfloor$$

$$q_8 = \lfloor \frac{N_{ID}^{(1)} + q_9(q_9+1)/2}{30} \rfloor$$

$$q_9 = \lfloor N_{ID}^{(1)}/30 \rfloor$$

$$N_{ID}^{(1)} = 0, 1 \ldots 464$$

Preferably, the step of determining the value of M according to the cell ID group index $N_{ID}^{(1)}$ comprises that:

1) when $N_{ID}^{(1)} < 234$, M=1;

preferably, the first cyclic shift value $m_0$ and the second cyclic shift value $m_1$ are calculated through the following formula:

$$m_0 = m' \bmod 31$$

$$m_1 = (m_0 + \lfloor m'/31 \rfloor + 1) \bmod 31$$

$$m' = N_{ID}^{(1)} + q(q+1)/2$$

$$q_0 = \lfloor \frac{N_{ID}^{(1)} + q'(q'+1)/2}{30} \rfloor$$

$$q_1 = \lfloor N_{ID}^{(1)}/30 \rfloor$$

2) when $234 =< N_{ID}^{(1)} < 329$, M=2;

preferably, the first cyclic shift value $m_0$ and the second cyclic shift value $m_1$ are calculated through the following formula:

$$m_0 = m' \bmod 31$$

$$m_1 = (m_0 + \lfloor m'/31 \rfloor + 1) \bmod 31$$

$$m' = N_{ID}^{(1)} + q_0(q_0+1)/2$$

$$q_0 = \lfloor \frac{N_{ID}^{(1)} + q_1(q_1+1)/2}{30} \rfloor$$

$$q_1 = \lfloor \frac{N_{ID}^{(1)} + q_2(q_2+1)/2}{30} \rfloor$$

$$q_2 = \lfloor N_{ID}^{(1)}/30 \rfloor$$

3) when $329 =< N_{ID}^{(1)} < 387$, M=3;

preferably, the first cyclic shift value $m_0$ and the second cyclic shift value $m_1$ are calculated through the following formula:

$$m_0 = m' \bmod 31$$

$$m_1 = (m_0 + \lfloor m'/31 \rfloor + 1) \bmod 31$$

$$m' = N_{ID}^{(1)} + q_0(q_0+1)/2$$

$$q_0 = \lfloor \frac{N_{ID}^{(1)} + q_1(q_1+1)/2}{30} \rfloor$$

$$q_1 = \lfloor \frac{N_{ID}^{(1)} + q_2(q_2+1)/2}{30} \rfloor$$

$$q_2 = \lfloor \frac{N_{ID}^{(1)} + q_3(q_3+1)/2}{30} \rfloor$$

$$q_3 = \lfloor N_{ID}^{(1)}/30 \rfloor$$

4) when $387 =< N_{ID}^{(1)} < 465$, M=9.

Preferably, the first cyclic shift value $m_0$ and the second cyclic shift value $m_1$ are calculated through the following formula:

$$m_0 = m' \bmod 31$$

$$m_1 = (m_0 + \lfloor m'/31 \rfloor + 1) \bmod 31$$

$$m' = N_{ID}^{(1)} + q_0(q_0+1)/2$$

$$q_0 = \lfloor \frac{N_{ID}^{(1)} + q_1(q_1+1)/2}{30} \rfloor$$

$$q_1 = \lfloor \frac{N_{ID}^{(1)} + q_2(q_2+1)/2}{30} \rfloor$$

$$q_2 = \lfloor \frac{N_{ID}^{(1)} + q_3(q_3+1)/2}{30} \rfloor$$

$$q_3 = \lfloor \frac{N_{ID}^{(1)} + q_4(q_4+1)/2}{30} \rfloor$$

$$q_4 = \lfloor \frac{N_{ID}^{(1)} + q_5(q_5+1)/2}{30} \rfloor$$

$$q_5 = \lfloor \frac{N_{ID}^{(1)} + q_6(q_6+1)/2}{30} \rfloor$$

$$q_6 = \lfloor \frac{N_{ID}^{(1)} + q_7(q_7+1)/2}{30} \rfloor$$

$$q_7 = \lfloor \frac{N_{ID}^{(1)} + q_8(q_8+1)/2}{30} \rfloor$$

$$q_8 = \lfloor \frac{N_{ID}^{(1)} + q_9(q_9+1)/2}{30} \rfloor$$

$$q_9 = \lfloor N_{ID}^{(1)}/30 \rfloor$$

Preferably, the step of generating the secondary synchronization signals according to $m_0$ and $m_1$ comprises that: a first shift sequence is obtained by shifting a Golden sequence according to $m_0$; and a second shift sequence is obtained by shifting the Golden sequence according to $m_1$.

Preferably, after generating the secondary synchronization signals according to $m_0$ and $m_1$, on time slot 0, the first shift sequence is transmitted on a carrier with an even index, and the second shift sequence is transmitted on a carrier with an odd index; on time slot 10, the second shift sequence is transmitted on a carrier with an even index, and the first shift sequence is transmitted on a carrier with an odd index.

In the above embodiment, the method of transmitting the shift sequences on time slot 0 and time slot 10 is only a typical example, and the present invention is not limited thereby; for example, the shift sequences which are generated via the above method can be transmitted on other time slots according to the actual demands.

Preferably, after generating the first shift sequence and the second shift sequence according to the above method and transmitting the first shift sequence and the second shift sequence, for the receiving party (such as a mobile terminal), the current time slot can be judged through the following steps:

Step 1: a third shift sequence is received on a carrier with an even index on the current time slot, and a fourth shift sequence is received on a carrier with an odd index on the current time slot;

Step 2: a third cyclic shift value $m_2$ corresponding to the third shift sequence and a fourth cyclic shift value $m_3$ corresponding to the fourth shift sequence are determined;

Step 3: $m_2$ and $m_3$ are compared;

Step 4: if $m_2$ is less than $m_3$, the current time slot is time slot 0;

Step 5: if $m_2$ is greater than $m_3$, the current time slot is time slot 10.

Furthermore, after determining $m_2$ and $m_3$, the receiving party also can obtain the cell ID group index $N_{ID}^{(1)}$ according to $m_2$ and $m_3$ via the following formula:

$$N_{ID}^{(1)} = \sum_{i=0}^{|m_2-m_3|-1} W_i + m_2$$

$$W_i = \mathrm{Mod}(31-i, 31)$$

The method for generating the secondary synchronization signals under the conditions of different number of cell ID groups is described below with reference to specific embodiments.

Embodiment 1

In the embodiment, suppose that the number N of the cell ID groups is 326, and the cell ID group index $N_{ID}^{(1)}$ corresponding to a certain cell is 196, therefore according to the embodiment of the present invention, as $N_{ID}^{(1)} < 234$, M=1. Furthermore, the cyclic shift values of two shift sequences can be obtained according to the following formula (3):

$$m_0 = m' \bmod 31 \quad (3)$$
$$m_1 = (m_0 + \lfloor m'/31 \rfloor + 1) \bmod 31$$
$$m' = N_{ID}^{(1)} + q_0(q_0+1)/2$$

-continued $$q_0 = \left\lfloor \frac{N_{ID}^{(1)} + q_1(q_1+1)/2}{30} \right\rfloor$$

$$q_1 = \lfloor N_{ID}^{(1)}/30 \rfloor$$

$$N_{ID}^{(1)} = 0, 1 \ldots 233$$

The specific calculation process is that: $q_1 = \lfloor N_{ID}^{(1)}/30 \rfloor = 6$ is obtained according to the cell ID group index 196; and then $q_0 = 7$ is obtained according to $$q_{k-1} = \left\lfloor \frac{N_{ID}^{(1)} + q_k(q_k+1)/2}{30} \right\rfloor,$$

m'=224 is further obtained according to $m' = N_{ID}^{(1)} + q_0(q_0+1)/2$; finally, the cyclic shift values $m_0$ and $m_1$ of the two shift sequences corresponding to the secondary synchronization signals can be calculated according to m':

$$m_0 = m' \bmod 31 = 7, m_1 = (m_0 + \lfloor m'/31 \rfloor + 1) \bmod 31 = 15.$$

According to the two cyclic shift values, two shift sequences of which the length is 31 are obtained by shifting an initial Golden sequence. According to the LTE method, in time slot 0: the shift sequence corresponding to $m_0$ is transmitted on the carrier with an even index, and the shift sequence corresponding to $m_1$ is transmitted on the carrier with an odd index; in time slot 10, the shift sequence corresponding to $m_1$ is transmitted on the carrier with an even index, and the shift sequence corresponding to $m_0$ is transmitted on the carrier with an odd index.

Suppose that at the receiving end, the terminal detects that the cyclic shift value $m_2$ corresponding to the shift sequence on the carrier with an even index in the current time slot is 7, the cyclic shift value $m_3$ corresponding to the shift sequence on the carrier with an odd index is 15, according to the above LTE method, as $m_2$ is less than $m_3$, the current time slot is time slot 0.

Furthermore, the cell ID group index $N_{ID}^{(1)}$ can be obtained according to the cyclic shift values of the two shift sequences via the following formula:

$$N_{ID}^{(1)} = \sum_{i=0}^{|m_2-m_3|-1} W_i + m_2$$

$$= \sum_{i=0}^{7} W_i + 7$$

$$= 196$$

$$W_i = \mathrm{Mod}(31-i, 31)$$

Embodiment 2

In the embodiment, suppose that the number N of the cell ID groups is 380, and the cell ID group index corresponding to a certain cell is 356, therefore, according to the embodiment of the present invention, as $329 < N < 387$, M=3. Furthermore, the cyclic shift values of two shift sequences can be obtained according to the following formula (4):

$$m_0 = m' \bmod 31$$

$$m_1 = (m_0 + \lfloor m'/31 \rfloor + 1) \bmod 31 \quad (4)$$

$$m' = N_{ID}^{(1)} + q_0(q_0+1)/2$$

$$q_0 = \left\lfloor \frac{N_{ID}^{(1)} + q_1(q_1+1)/2}{30} \right\rfloor$$

$$q_1 = \left\lfloor \frac{N_{ID}^{(1)} + q_2(q_2+1)/2}{30} \right\rfloor$$

$$q_2 = \left\lfloor \frac{N_{ID}^{(1)} + q_3(q_3+1)/2}{30} \right\rfloor$$

$$q_3 = \lfloor N_{ID}^{(1)}/30 \rfloor$$

$$N_{ID}^{(1)} = 0, 1 \ldots 386$$

The specific calculation process is that: $q_3 = \lfloor N_{ID}^{(1)}/30 \rfloor = 11$ is obtained according to the cell ID group index 356; and then $q_0 = 15$ is obtained according to $$q_{k-1} = \left\lfloor \frac{N_{ID}^{(1)} + q_k(q_k+1)/2}{30} \right\rfloor (1 \leq k \leq 3)$$

via three times of iterations, m'=476 is further obtained according to $m' = q_0(q_0+1)/2$; finally, the cyclic shift values $m_0$ and $m_1$ of the two shift sequences corresponding to the secondary synchronization signals can be calculated according to m':

$$m_0 = m' \bmod 31 = 11, m_1 = (m_0 + \lfloor m'/31 \rfloor + 1) \bmod 31 = 27$$

According to the two cyclic shift values, two shift sequences of which the length is 31 are obtained by shifting an initial Golden sequence. According to the LTE method, in time slot 0: the sequence corresponding to $m_0$ is transmitted on the carrier with an even index, and the sequence corresponding to $m_1$ is transmitted on the carrier with an odd index; in time slot 10, the sequence corresponding to $m_1$ is transmitted on the carrier with an even index, and the sequence corresponding to $m_0$ is transmitted on the carrier with an odd index.

Suppose that at the receiving end, the terminal detects that the cyclic shift value $m_2$ corresponding to the shift sequence on the carrier with an even index in the current time slot is 27, the cyclic shift value $m_3$ corresponding to the shift sequence on the carrier with an odd index is 11, according to the above LTE method, as $m_2$ is greater than $m_3$, the current time slot is time slot 10.

Furthermore, the cell ID group index $N_{ID}^{(1)}$ can be obtained according to the cyclic shift values of the two shift sequences via the following formula:

$$N_{ID}^{(1)} = \sum_{i=0}^{|m_2-m_3|-1} W_i + m_2$$

$$= \sum_{i=0}^{15} W_i + 7$$

$$= 356$$

$$W_i = \text{Mod}(31-i, 31)$$

Embodiment 3

In this embodiment, suppose that the number N of the cell ID groups is 360, the cell ID group index $N_{ID}^{(1)}$ corresponding to a certain cell is 126. The value of M can be calculated according to the cell ID group index $N_{ID}^{(1)}$; as $N_{ID}^{(1)} < 234$, M=1. The cyclic shift values of the two shift sequences can be obtained according to the formula (3), namely, $m_0 = 12$, and $m_1 = 17$. Alternatively, the value of M can be calculated according to the total number N of the cell ID groups, as N<387, M=3, thus the cyclic shift values of the two short code sequences can be obtained according to the formula (4), namely, $m_0 = 12$, and $m_1 = 17$.

The results of the two methods are the same, thus the two methods for obtaining the value of M provided by the embodiments of the present invention have the same effects, as the methods for generating the secondary synchronization signals provided by the embodiments of the present invention have excellent compatibility. The method for generating the secondary synchronization signals provided by the embodiments of the present invention can be compatible with the current method for generating the secondary synchronization signals in the LTE, without increasing the complexity of searching cells at the receiving end. After correctly detecting the cyclic shift values of the two shift sequences, the UE at the receiving end can obtain the correct frame synchronization information, and obtain the corresponding cell ID group index value according to the formula (2).

It can be concluded from the above embodiments that the method for generating the secondary synchronization signals according to the embodiments of the present invention can support the generation of the secondary synchronization signals under a greater number of cell ID groups, and can be better compatible with the LTE, thus to simplify the realization complexity of the receiving end. Additionally, according to the method for generating the secondary synchronization signals according to the embodiments of the present invention, the terminal can continue to use the method for determining the cell ID group index and the frame synchronization of the LTE, without increasing the complexity of the terminal.

Figure 3:
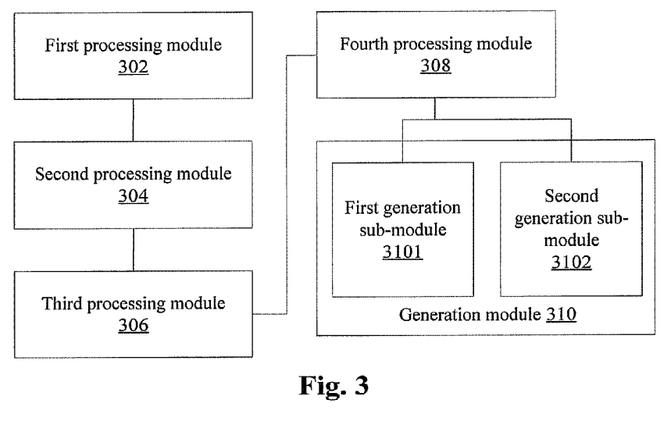
FIG. 3 shows a diagram of an apparatus for generating secondary synchronization signals according to an embodiment of the present invention.

An embodiment of the present invention also provides an apparatus for generating the secondary synchronization signals. As shown in FIG. 3, the apparatus for generating the secondary synchronization signals comprises: a first processing module 302, a second processing module 304, a third processing module 306, a fourth processing module 308 and a generation module 310 which are connected in sequence.

In the working condition, the first processing module 302 is configured to determine the value of M according to the total number N of the cell ID groups or the cell ID group index $N_{ID}^{(1)}$, wherein M is a natural number.

Preferably, the process of determining the value of M according to the total number N of the cell ID groups comprises that: when N<234, M=1; when 234=<N<329, M=2; when 329=<N<387, M=3; when 387=<N<465, M=9.

Preferably, the process of determining the value of M according to the cell ID group index $N_{ID}^{(1)}$ comprises that: when $N_{ID}^{(1)}<234$, M=1; when $234=<N_{ID}^{(1)}<329$, M=2; when $329=<N_{ID}^{(1)}<387$, M=3; when $387=<N_{ID}^{(1)}<465$, M=9.

After determining the value of M, the second processing module 304 calculates M cyclic shift accumulation parameters $q_k$ (k=0, 1 . . . M−1) through M times of iterations.

Preferably, the second processing module 304 is configured to calculate M cyclic shift accumulation parameters $q_k$ (k=0, 1 . . . M−1) through the following formula:

$$q_M = \lfloor N_{ID}^{(1)}/30 \rfloor;$$

$$q_{k-1} = \left\lfloor \frac{N_{ID}^{(1)} + q_k(q_k+1)/2}{30} \right\rfloor (1 \leq k \leq M).$$

Afterwards, the third processing module 306 calculates the common cyclic shift factor m' through $q_0$.

Preferably, the third processing module 306 is configured to calculate the common cyclic shift factor m' through the following formula:

$$m'=N_{ID}^{(1)}+q_0(q_0+1)/2$$

And then, the fourth processing module 308 calculates the first cyclic shift value $m_0$ and the second cyclic shift value $m_1$ according to m'.

Preferably, the fourth processing module 308 is configured to calculate the first cyclic shift value $m_0$ and the second cyclic shift value $m_1$ through the following formula:

$$m_0 = m' \bmod 31, m_1 = (m_0 + \lfloor m'/31 \rfloor + 1) \bmod 31.$$

And then, the generation module 310 generates the secondary synchronization signals according to $m_0$ and $m_1$.

Preferably, the generation module 310 comprises: a first generation sub-module 3101, configured to obtain the first shift sequence by shifting the Golden sequence according to $m_0$; and a second generation sub-module, configured to obtain the second shift sequence by shifting the Golden sequence according to $m_1$.

After generating the secondary synchronization signals according to $m_0$ and $m_1$, in time slot 0, the first shift sequence is transmitted on a carrier with an even index, and the second shift sequence is transmitted on the carrier with an odd index; in time slot 10, the second shift sequence is transmitted on the carrier with an even index, and the first shift sequence is transmitted on the carrier with an odd index.

In conclusion, the embodiments of the present invention have the advantages as follows.

1) The embodiments of the present invention select different M values for different cell ID group indexes $N_{ID}^{(1)}$, to calculate, according to the M values, $m_0$ and $m_1$ which are used for generating the secondary synchronization signals. The secondary synchronization signals which are generated through such method can support a greater number of cell ID groups. The problem that the method for generating the secondary synchronization signals in the related technologies cannot support a greater number of the cell ID groups can be solved, and the requirements of the greater number of the cell ID groups can be satisfied.

2) The method for generating the secondary synchronization signals provided by the embodiments of the present invention has excellent backward compatibility, which greatly simplifies the realization complexity of the transmitting end. Additionally, the embodiments of the present invention guarantee that the receiving end can realize the frame synchronization and cell ID group index detection, so as to simplify the realization complexity of the terminal.

It should be noted that, the steps shown in the flow chart of the drawings can be executed in the computer system such as a group of computer-executable instructions, and although the logic sequences are shown in the flow chart, the steps which are shown or described can be executed according to different sequences in some conditions.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the present invention is not restricted to any particular hardware and software combination.

The descriptions above are only the preferable embodiment of the present invention, which are not used to restrict the present invention. For those skilled in the art, the present invention may have various changes and variations. Any amendments, equivalent substitutions, improvements, etc. within the principle of the present invention are all included in the scope of the protection of the present invention.

What is claimed is:

1. A method for generating secondary synchronization signals, executed by a base station, comprising:
   determining a value of iteration times M according to a total number N of cell ID groups or a cell ID group index $N_{ID}^{(1)}$, wherein M is a natural number;
   calculating to obtain M cyclic shift accumulation parameters $q_k$ (k=0, 1 ... M−1) through M times of iterations;
   calculating a common cyclic shift factor m' through $q_0$;
   calculating a first cyclic shift value $m_0$ and a second cyclic shift value $m_1$ according to m'; and
   generating the secondary synchronization signals according to $m_0$ and $m_1$.

2. The method according to claim 1, wherein the step of calculating to obtain the M cyclic shift accumulation parameters $q_k$ (k=0, 1 ... M−1) through M times of iterations comprises:

$$q_M = \lfloor N_{ID}^{(1)}/30 \rfloor;$$

$$q_{k-1} = \left\lfloor \frac{N_{ID}^{(1)} + q_k(q_k+1)/2}{30} \right\rfloor (1 \le k \le M).$$

3. The method according to claim 1, wherein the step of calculating the common cyclic shift factor m' through $q_0$ comprises:

$$m'=N_{ID}^{(1)}+q_0(q_0+1)/2.$$

4. The method according to claim 1, wherein the step of calculating the first cyclic shift value $m_0$ and the second cyclic shift value $m_1$ according to m' comprises:

$$m_0 = m' \bmod 31, m_1 = (m_0 + \lfloor m'/31 \rfloor + 1) \bmod 31.$$

5. The method according to claim 1, wherein the step of determining the value of M according to the total number N of the cell ID groups comprises:
   when N<234, M=1;
   when 234=<N<329, M=2;
   when 329=<N<387, M=3;
   when 387=<N<465, M=9.

6. The method according to claim 1, wherein the step of determining the value of M according to the cell ID group index Ng comprises:
   when $N_{ID}^{(1)}$<234, M=1;
   when 234=<$N_{ID}^{(1)}$<329, M=2;
   when 329=<$N_{ID}^{(1)}$<387, M=3;
   when 387=<$N_{ID}^{(1)}$<465, M=9.

7. The method according to claim 1, wherein the step of generating the secondary synchronization signals according to $m_0$ and $m_1$ comprises:
   obtaining a first shift sequence by shifting a Golden sequence according to $m_0$; and
   obtaining a second shift sequence by shifting the Golden sequence according to $m_1$.

8. The method according to claim 7, wherein after the step of generating the secondary synchronization signals according to $m_0$ and $m_1$, the method further comprises:
- on time slot 0, transmitting the first shift sequence on a carrier with an even index, and transmitting the second shift sequence on a carrier with an odd index;
- on time slot 10, transmitting the second shift sequence on a carrier with an even index, and transmitting the first shift sequence on a carrier with an odd index.

9. The method according to claim 8, wherein after the step of transmitting the first shift sequence and the second shift sequence, the method further comprises:
- receiving a third shift sequence on a carrier with an even index on a current time slot, and receiving a fourth shift sequence on a carrier with an odd index on the current time slot;
- determining a third cyclic shift value $m_2$ corresponding to the third shift sequence and a fourth cyclic shift value $m_3$ corresponding to the fourth shift sequence;
- comparing $m_2$ and $m_3$;
- if $m_2$ is less than $m_3$, representing that the current time slot is time slot 0;
- if $m_2$ is greater than $m_3$, representing that the current time slot is time slot 10.

10. The method according to claim 9, wherein after the step of determining $m_2$ and $m_3$, the method further comprises:
- obtaining the cell ID group index $N_{ID}^{(1)}$ according to $m_2$ and $m_3$, wherein $$N_{ID}^{(1)} = \sum_{i=0}^{|m_2 - m_3| - 1} W_i + m_2$$

$$W_i = \text{Mod}(31 - i, 31).$$

11. An apparatus for generating secondary synchronization signals, comprising:
- a first processing module, configured to determine a value of iteration times M according to a total number N of cell ID groups or a cell ID group index $N_{ID}^{(1)}$, wherein M is a natural number;
- a second processing module, configured to calculate to obtain M cyclic shift accumulation parameters $q_k$ ($k=0, 1 \ldots M-1$) through M times of iterations;
- a third processing module, configured to calculate a common cyclic shift factor m' through $q_0$;
- a fourth processing module, configured to calculate a first cyclic shift value $m_0$ and a second cyclic shift value $m_1$ according to m'; and
- a generation module, configured to generate the secondary synchronization signals according to $m_0$ and $m_1$.

12. The apparatus according to claim 11, wherein the second processing module is configured to calculate to obtain the M cyclic shift accumulation parameters $q_k$ ($k=0, 1 \ldots M-1$) through the following formula:

$$q_M = \lfloor N_{ID}^{(1)}/30 \rfloor;$$

$$q_{k-1} = \left\lfloor \frac{N_{ID}^{(1)} + q_k(q_k+1)/2}{30} \right\rfloor (1 \le k \le M).$$

13. The apparatus according to claim 11, wherein the third processing module is configured to calculate the common cyclic shift factor m' through the following formula:

$$m' = N_{ID}^{(1)} + q_0(q_0+1)/2.$$

14. The apparatus according to claim 11, wherein the fourth processing module is configured to calculate the first cyclic shift value $m_0$ and the second cyclic shift value $m_1$ through the following formula:

$$m_0 = m' \bmod 31, m_1 = (m_0 + \lfloor m'/31 \rfloor + 1) \bmod 31.$$

15. The apparatus according to claim 11, wherein the generation module comprises:
- a first generation sub-module, configured to obtain a first shift sequence by shifting a Golden sequence according to $m_0$; and
- a second generation sub-module, configured to obtain a second shift sequence by shifting the Golden sequence according to $m_1$.

* * * * *